United States Patent

[11] 3,550,636

[72] Inventors Willis H. Hearne;
Hildagarde M. Hearne, P.O. Box 338,
Blythe, Calif. 92225
[21] Appl. No. 755,187
[22] Filed Aug. 26, 1968
[45] Patented Dec. 29, 1970

[54] PLASTIC BALL, BOLT AND WING SET
6 Claims, 4 Drawing Figs.
[52] U.S. Cl. ..................................................... 138/89,
220/24.5
[51] Int. Cl. ..................................................... F16l 55/10
[50] Field of Search ........................................ 138/89;
220/24.5

[56] References Cited
UNITED STATES PATENTS
| | | | |
|---|---|---|---|
| 630,011 | 8/1899 | Smith | 138/89X |
| 1,226,209 | 5/1917 | Harris | 138/89 |
| 1,993,307 | 3/1935 | Nicholson | 138/89 |
| 2,670,799 | 3/1954 | Dobbs | 138/89X |
| 2,750,601 | 6/1956 | Houle | 138/89X |
| 2,924,246 | 2/1960 | Markel | 138/89 |
| 3,015,469 | 1/1962 | Falk | 138/89 |

Primary Examiner—James Kee Chi
Attorney—Carl Miller

ABSTRACT: To provide a liquidtight closure for the open discharge end of a pipe through which a liquid such as water flows as a replacement for the customary threaded cap or plug fitted to the open end of the pipe. There is utilized a compressible solid ball of rubber or other suitable plastic material having a diameter corresponding substantially to the inside diameter of the pipe so as to be easily insertable therein. Extending diametrically through the ball is a bolt having a head at one end engageable with one side of the ball and having its threaded end portion projecting outwardly from the other side of the ball. Fitted on the threaded end portion is a wingnut. Washers are inserted on the bolt to be engaged by the head and wingnut. With the ball placed in the open end of the pipe, setting up on the wingnut will compress the ball to expand radially so as to tightly engage the inside wall of the pipe to effect a liquidtight seal.

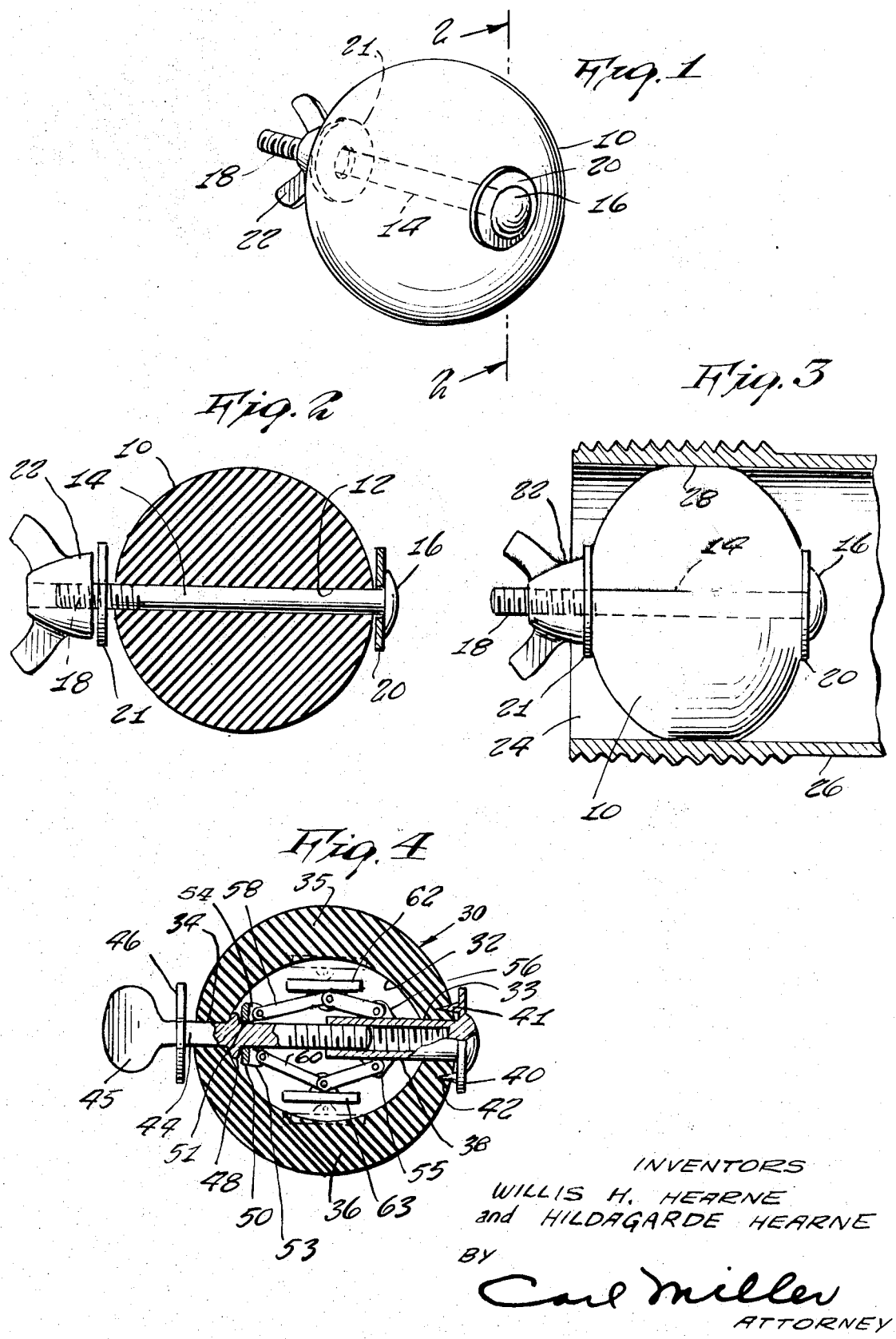

PLASTIC BALL, BOLT AND WING SET

In a modified form of the invention, the ball is a hollow deformable sphere. An interiorly threaded sleeve is inserted into the sphere from one side and of a length equal to at least one-half the diameter of the sphere. A bolt having a winghead is inserted into the sphere from its other side to threadedly fit within the sleeve. A dial toggle linkage interconnects the bolt and sleeve with opposed pressure plates. Turning the bolt into the sleeve will collapse the toggle linkage so as to push the pressure plates radially outwardly, the sleeve being subjected to lateral deformation both by the drawing together of the bolt and sleeve as well as by the radial outward pressure exerted by the pressure plates. The sleeve is nonrotatably locked to the sphere and one end of the dual toggle linkage is pivotally connected to the sleeve. The other end of the toggle linkage is pivoted to an abutment plate through which the shank of the bolt rotatably extends.

This invention relates to fluidtight closure for the open discharge end of a pipe and more particularly to a deformable and/or compressible plastic ball member insertable into the open end of the pipe and deformed radially outwardly by force applied thereto to effect a liquid tight seal or closure.

In water supply pipelines to supply water to water troughs in cattle feed lots it is customary to provide the discharge ends of the pipes either with a threaded closure cap or a threaded plug. This requires each time it is necessary to fill the water troughs the use of a wrench or plier to remove the closure cap or plug. In time, the threads become rusty or worn with the consequent added difficulty of removing and putting back the closure cap or plug. Also, in time there will result a leakage of water making the watering troughs or pens messy and objectionable. As the same are filled and cleaned each day the resulting time and effort to remove the caps or plugs is both inefficient and wasteful.

It is accordingly the primary object of this invention to replace the threaded closure cap or plug at the discharge end of a pipeline with a compressible and/or deformable ball element provided with a threaded bolt having a wingnut for insertion into the open end of the pipe and by setting up on the wingnut to laterally compress the ball so as to expand radially outwardly to grip the inside of the pipe to effect a liquidtight seal.

Another object of this invention is to form the ball solid of rubber or other suitable plastic material with the bolt extending diametrically therethrough having a head on one end to lie on one side of the ball and its other end projecting outwardly of the other side of the ball and carrying the wingnut, the ball being of a diameter so as to easily fit into the pipe with the bolt disposed axially thereof, being a washer at each end of the bolt between the head and wingnut to be engaged thereby.

A further object of this invention is to form the compressible and/or deformable ball as a thick-walled hollow sphere having separate coacting threaded elements, one fixed and the other rotatable extending diametrically through the hollow sphere and a dual toggle linkage within the hollow sphere operated by rotating one of the threaded elements to collapse or expand the toggle linkage radially outwardly to apply pressure on the opposed interior sides of the hollow sphere in a plane normal to the pipe axis.

A still further object of this invention is to provide a pressure plate connected to each toggle linkage and movable thereby when collapsed to apply the desired pressure on the inside wall of the sphere.

Yet another object of this invention is to form one of the threaded element elements of the hollow sphere as an interiorly threaded sleeve including prongs on its head to nonrotatably lock the sleeve to the sphere, the other threaded element being a bolt having a winghead threadedly fitting within the sleeve.

Still another object of this invention is to provide an abutment plate on the bolt through which the bolt rotatably extends, one end of the dual toggle linkage being pivotally connected to the abutment plate and the other end of the dual toggle linkage being pivotally connected to the fixed sleeve, the adjacent ends of each pair of links, each being pivoted to the pressure plate, there being one pair on each side of the sleeve and bolt in opposed relation.

Further objects of the invention will appear as the description proceeds.

To the accomplishment of the above and related objects, our invention may be embodied in the form illustrated in the accompanying drawings, attention being called to the fact, however, that the drawings are illustrative only, and that change may be made in the specific construction illustrated and described within the scope of the appended claims.

FIG. 1 is a perspective view of the solid deformable ball closure.

FIG. 2 is a cross-sectional view thereof taken on line 2—2, FIG. 1.

FIG. 3 shows the ball closure of FIG. 1 in use within the discharge end of a pipe.

FIG. 4 illustrates a modified form of the invention employing a hollow thick-walled ball closure.

Referring now to the drawings in more detail, and particularly to the form of the invention shown in FIGS. 1, 2 and 3, there is shown a solid ball member 10 made of rubber or other suitable plastic material that is similarly compressible, deformable and resilient. Extending diametrically through the ball member 10 is a bolt-receiving bore 12, through which extends, preferably in a close fit, a bolt 14 having a head 16. The bolt 14 is of such a length that its threaded end portion 18 projects outwardly of the ball member 10 as shown in FIG. 1, 2 and 3. Fitted on bolt 14 adjacent head 16 is a washer 20. A similar washer 21 is placed on the threaded portion 18 to be engaged by a wingnut 22 threaded on threaded portion 18. Both washers 20, 21 are of somewhat large diameter so as to engage substantial areas of the ball 10.

The ball 10 is of a diameter such as to be easily insertable within the open discharge end 24 of a water pipe 26 and is therefore designed for a particular pipe size. In other words, the ball diameter is normally slightly less than the inside pipe diameter. The ball 10 with its assembled bolt and washer in use is inserted into the open end of pipe 26 with the bolt 14 coaxial with the pipe axis. Setting up of the wingnut 22 on the bolt 14 will cause the washers 20, 21 to engage opposed sides of the ball 10 to compress or deform the same so as to expand radially outwardly to provide a cylindrical surface area of contact 28 with the inside wall surface of the pipe 26. Experience will determine just how far the wingnut 22 is to be set up on the bolt 14 to secure the desired extent of surface area of contact so as to establish the desired positive water tight seal. The frictional and/or pressure engagement of the deformed ball with the inside wall of the pipe is such that the ball can withstand the pressure of the liquid acting thereon without any danger of being dislodged thus making for a perfect closure and water seal.

As is apparent, the ball closure device is simply installed and is easily removed to permit flow of water from the pipe by reverse turning of the wingnut 22 which will permit the ball 10 to return to its normal spherical shape.

FIG. 4 illustrates a preferred modification of the ball closure device of FIGS. 1, 2 and 3 and is usable in the same manner. In this case, the ball 30 is formed as a hollow sphere of rubber or other suitable plastic material similar to that of ball 10. The inside hollow surface 32 of the ball or sphere 30 is substantially ellipsoidal so that the opposed ends of the ball 30 provided with coaxial bores 33, 34 are of less thickness than the opposed sides of the ball as at 35, 36. Fitted within bore 34 is an interiorly threaded sleeve 38 having an integral flanged head 40 provided with prongs 41, 42 which penetrates the side of the ball 30, one on each side of bore 33 so as to secure the sleeve 38 nonrotatably to the ball. The length of sleeve 38 is substantially one-half the diameter of the ball 30. Extending through bore 34 into the ball and in threaded engagement with sleeve 38 is a bolt 44 having an outer winghead 45 and an adjacent integral flange 46. If desired, flange 46 may be a washer element, the bolt 44 is provided interiorly of the ball 30 with an abutment flange 48 that engages the inside of wall surface 32 adjacent bore 34. Fitted loosely on bolt 44 inwardly of abutment flange is an abutment plate 50 having a central opening 51 through which the shank of the bolt extends so as to rotatable therein. Provided on abutment plate 50 are lugs 53, 54. Similar lugs 55, 56 are provided on sleeve 38. Connecting by suitable pivot pins lugs 53 and 55 is a toggle linkage 58. A similar toggle linkage 60 is pivotally connected to lugs 54, 56. In the normal unstressed condition of hollow ball 30 the dual toggle linkage 58, 60 is in extended position. Each toggle linkage at the pivot point of connection of its links is provided with a pressure plate 62, 63 respectively to which the links are pivotally connected. The pressure plates 62, 63 lie parallel to the axis of the bolt 44 and sleeve 38 and in the unstressed condition of the hollow ball 30 are normally spaced from the thicker wall portions 35, 36 of the hollow ball.

In the assembly of the sleeve, bolt and toggle linkage with the hollow ball 30, the latter may be formed initially in separate halves along the bores 33, 34 superposed over the assembled sleeve, bolt and dual toggle linkage and suitably bonded together. Other methods and/or means of assembling the hollow ball 30 and its associated parts are known to those skilled in the art and form no part of the present invention.

The hollow ball 30 in use is placed within the open discharge end of pipe 26 and is compressed and/or deformed by turning bolt 44 so as to move inwardly of sleeve 38, it being noted that sleeve 38 is fixed in relation to the ball by means of prongs 41, 42. The inward movement of the bolt 44 will cause abutment flange 48 to push against abutment plate 50 to collapse the dual toggle linkage 58, 60 moving pressure plates 62, 63 radially outwardly against walls 35, 36. This action is simultaneous with compression of the ball 30 between sleeve flange 40 and bolt flange 46, and will create a cylindrical zone of contact similar to 28 of ball 10. The dual pressure thus set up by deformation of the hollow ball and the radial force exerted outwardly against the thicker wall portions 35, 36 will effect a fluidtight seal of maximum strength and efficiency. Installation of the hollow ball as a closure for the pipe 26 and its removal is just as simple as that of the solid ball 10.

While certain novel features of my invention have been shown and described and are pointed out in the annexed claims, it will be understood that various omissions, substitutions and changes in the forms and details of the device illustrated and in its operation can be made by those skilled in the art without departing from the spirit of the invention.

We claim:

1. A readily insertable and removable closure plug for the open discharge end of a pipe having fluid under pressure flowing therein comprising:
   a. a hollow deformable ball member of an outside diameter permitting its insertion into the open end of the pipe;
   b. an interiorly threaded sleeve extending diametrically into said hollow ball member from one side thereof;
   c. a bolt coaxial with said sleeve extending into said hollow ball member from the other side thereof and in threaded engagement with said sleeve;
   d. a flange and head on the exterior end of said sleeve forming a closure therefore and integral therewith;
   e. a winghead and flange integral with the outer end of said bolt;
   f. toggle linkage means interiorly of said hollow ball member pivotally connected to said sleeve and bolt; and
   g. pressure plate means carried by said toggle linkage means engageable with opposed interior side portions of said hollow ball member parallel to the axis of said bolt and sleeve, whereby, when said bolt is turned so as to move inwardly of sleeve towards the flange head thereof said hollow ball member will be deformed between the bolt and sleeve flanges and said pressure plate means will be moved radially outwardly on collapse of said toggle linkage to apply pressure force against the wall of the hollow ball member, the deformation of the hollow ball member being such as to form a cylindrical zone of surface contact with the inside wall of said pipe and said pressure plate means applying its pressure force in said cylindrical zone to effect both together a fluidtight seal.

2. The deformable pipe closure of claim 1, wherein the interior of said hollow ball is ellipsoidal providing thin wall portions adjacent said sleeve and bolt and thick wall portions parallel to the axis of said sleeve and bolt.

3. The deformable pipe closure of claim 2, including:
   a. integral abutment flange on said bolt interiorly of said hollow ball member engageable with the inside surface thereof at an adjacent thin wall portion;
   b. an abutment plate having a central opening through which said bolt rotatably extends engageable with said abutment flange;
   c. a dual pair of toggle links constituting said toggle linkage means one pair on each side of said bolt and sleeve;
   d. corresponding ends of the links of each pair being pivotally connected to said abutment plate; and
   e. corresponding ends of the other links of each pair being pivotally connected to said sleeve interiorly of said hollow ball member.

4. The deformable pipe closure of claim 3, including means on the flange exterior end of said sleeve engageable with the adjacent thin wall portion of the wall of the hollow ball to hold the sleeve in fixed nonrotatable relation thereto.

5. The deformable pipe closure of claim 4, including pivots on each pressure plate each connecting the adjacent ends of the links of each toggle linkage.

6. The deformable pipe closure of claim 5, wherein the holding means on the flanged end of said sleeve comprises:
   a. a pair of prongs;
   b. each said prong being disposed on opposite sides of said sleeve and penetrating the adjacent thin wall portion of the hollow ball member; and
   c. said ball member being formed of a compressible and deformable plastic material such as to return to its normal unstressed condition on release of the forces deforming the same.